United States Patent Office 2,897,201
Patented July 28, 1959

2,897,201

EPOXY QUATERNARY AMMONIUM COMPOUNDS

Otto Albrecht, Neuewelt, near Basel, Switzerland, assignor to Ciba Limited, Basel, Switzerland, a Swiss firm No Drawing. Application May 23, 1955
Serial No. 510,529

Claims priority, application Switzerland May 26, 1954

2 Claims. (Cl. 260—268)

This invention provides new water-soluble quaternary ammonium compounds which contain at least two quaternary nitrogen atoms to each of which is bound a residue containing an epoxy group, and in which any carbon atom bound to two nitrogen atoms has only single bonds. The invention provides more especially compounds of this kind, which contain the epoxy-propyl group bound to each of the quaternary nitrogen atoms, and among these compounds, more especially, those which also contain one or more hydroxyalkyl groups.

The compounds of this invention are made by methods in themselves known. Thus, an amine, which contains at least two tertiary amino groups and in which any carbon atom bound to two nitrogen atoms has only single bonds, may be treated with a quaternating agent capable of introducing an epoxy group, in order to produce a compound of this invention. As quaternating agents there are suitable, more especially, epihalogenhydrins, and preferably epichlorhydrin. Alternatively an amine of the above kind, which contains two tertiary groups to each of which is bound a radical containing an epoxy group, for example, a radical containing a glycidic acid ester group, may be treated with a quaternating agent. Owing to the fact that any carbon atom bound to two nitrogen atoms, in the amine to be used as starting material and in the final product, has only single bonds, compounds of the urea or triazine group are excluded, because they contain at least one carbon atom which is bound to two nitrogen atoms and has a double bond. On the other hand, the compounds of this invention may contain carboxylic acid amide groups, because the

group is bound to a nitrogen atom only on one side.

The reaction of the tertiary amines to form quaternary ammonium compounds may be carried out under conditions usual for such reactions. Advantageously, the components are heated at a raised temperature, for example, 70–120° C., and advantageously in an inert atmosphere, for example, in a current of nitrogen, and if desired, with the addition of an inert solvent.

As starting materials for making the new quaternary ammonium compounds there may be used a very wide variety of amines which contain at least two tertiary amino groups capable of being quaternated or at least two amino groups convertible into such tertiary amino groups. If the amine used as starting material contains only one or no tertiary amino group, the tertiary amino groups or tertiary amino group may first be formed in known manner, for example, by alkylation or aralkylation. The formation of the tertiary amines is advantageously carried out by hydroxyalkylation, especially hydroxyethylation, that is to say, reaction with ethylene oxide. There are mentioned below a few amines from among those suitable in the present invention, and it is to be understood that in the case of amines containing no or only one tertiary amino group the necessary tertiary amino groups or group are first formed.

There may be used aliphatic diamines or polyamines which contain no hydrocarbon radicals of high molecular weight, for example, ethylene diamine, propylene diamine, hexamethylene diamine; and also polyalkylene polyamines such as diethylenetriamine, triethylenetetramine, tetraethylene pentamine or polyalkylene polyamines of higher molecular weight. Among these polyalkylene polyamines there are advantageously used their hydroxyethylation products.

There may also be used aliphatic diamines or polyamines which contain a hydrocarbon radical of high molecular weight. Such compounds may be derived from the amines mentioned above, and can be obtained by condensing such amines with compounds capable of introducing a hydrocarbon radical of high molecular weight such, for example, as fatty acids or functional derivatives thereof, such as acid chlorides, esters or methylol-amides. Under the term "hydrocarbon radicals of high molecular weight" there are included radicals which contain about 8–40, and advantageously 12–18, carbon atoms such, for example, as lauric acid, palmitic acid, stearic acid, behenic acid, oleic acid or the fatty acids of the last distillation runnings and derivatives thereof. Thus, there may be used as starting materials, for example, condensation products of hydroxyethylated polyalkylene polyamines with fatty acids or their methylol-amides, for example, with stearic acid or stearic acid N-methylolamide. Diamines and polyamines containing a hydrocarbon radical of high molecular weight, which may be used in the invention, also include those which contain the hydrocarbon radical bound directly to a nitrogen atom. Such compounds are obtainable, for example, by the additive combination of acrylonitrile with an amine containing a hydrocarbon radical of high molecular weight, and reduction of the nitrile group to an amino group.

Furthermore there may be used as starting materials heterocyclic amines, such as piperazine, or amines which belong to different classes or mixtures of different amines.

The quaternary ammonium compounds of the invention are soluble in water at least in the case of salts with anions of the usual acids. They can be used for a very wide variety of purposes, because they are reactive owing to the presence of at least two epoxy groups in the molecule. They can be used for the manufacture of compositions suitable for moulding under pressure and shaped bodies, films or adhesive agents, by using them in conjunction with compounds capable of reacting with epoxy groups. They are capable, for example, of bringing about cross-linking in certain polymerization or condensation products. Products of the invention which have been made from suitable starting materials, may be used as textile assistants in the textile, leather, paper or allied industries. They can be used for producing impregnations and coatings, for example, on glass fibers, glass threads or structures produced therefrom, and also for imparting a soft feel to fibers of cellulose, polyamides or polyacrylonitrile, or for imparting an anti-electrostatic effect to fibers which are liable to become electrically charged. Compounds which contain suitable substituents may be used for imparting water-repellent dressings to textiles or for improving the properties of wet fastness of dyeings produced with direct dyestuffs or for bringing about cross linking in assistants used in processes for dyeing or printing with pigments.

The following examples illustrate the invention, the parts being by weight unless otherwise stated, and the relationship of parts by weight to parts by volume being the same so that of the kilogram to the liter:

Example 1

65 parts of a mixture of N-alkyl-trimethylene diamines, in which the alkyl residues correspond to those of the fatty acids present in tallow, are heated to 135–140° C. in a current of nitrogen, and then 65 parts of ethylene oxide are introduced in the form of a finely distributed gas stream.

200 parts of the reaction product so obtained are heated with 176.5 parts of epichlorhydrin in a current of nitrogen for 6 hours on a boiling water bath. Then the volatile constituents are removed by heating for a further 2 hours under reduced pressure in a boiling water bath. The reaction product, which is a viscous ropy mass, is clearly soluble in water. For the purpose of purification it may be stirred with acetone, whereupon any starting materials still present pass into solution. The product may be used as a softening agent for textiles.

Example 2

73 parts of triethylene tetramine are heated in a current of nitrogen to 145° C., and 270 parts of commercial stearic acid are added in the course of three hours at 140–145° C. The water formed during the reaction is distilled off. The reaction temperature is then maintained for 5 hours at 140–145° C., during which a current of nitrogen is continuously passed through the apparatus. 50 parts of the amide so obtained are heated in a current of nitrogen to 110° C., and then 7.5 parts of ethylene oxide are introduced in the form of a finely distributed gas stream at 110–130° C.

50 parts of the hydroxyethylation product described above and 18.8 parts of epichlorhydrin are stirred for 6 hours in a current of nitrogen in a boiling water bath. The new quaternary ammonium salt, which is a soft mass, can be taken up in hot water to form a feebly opalescent solution and can be used as an agent for softening textiles.

Example 3

51.5 parts of diethylene triamine are heated in a current of nitrogen at 120° C., and then 110 parts of ethylene oxide are introduced at 120–125° C. in the form of a finely distributed gas stream.

A mixture of 38.4 parts of the resulting hydroxyethylation product, 71.2 parts of stearic acid N-methlolamide from commercial stearic acid and 4.8 parts of anhydrous sodium carbonate is heated in a current of nitrogen to 108° C., and the whole is stirred for 4 hours at 108–111° C. under reduced pressure. During the first hour the pressure is maintained at 540 mm. of mercury, during the second hour at 340 mm. and during the last two hours at 140 mm.

88.5 parts of the resulting condensation product and 55.5 parts of epichlorhydrin are stirred in a current of nitrogen for 6 hours in a boiling water bath. After removing the volatile constituents under reduced pressure at 90–95° C., the resulting new quaternary ammonium salt is a wax like mass which can be taken up in hot water to an almost clear solution. It can be used as an agent for softening textiles.

Example 4

25 parts of diethylene triamine are heated in a current of nitrogen to 120° C., and then 74.7 parts of ethylene oxide are introduced at 120–140° C. in the form of a finely distributed gas stream.

20.6 parts of the condensation product so obtained, 75 parts of stearic acid N-methylol-amide from commercial stearic acid and 5 parts of anhydrous sodium carbonate are heated in the manner described in the second paragraph of Example 3.

181.6 parts of the reaction product described above are heated with 55.5 parts of epichlorhydrin for 6 hours in a current of nitrogen in a boiling water bath, and then the volatile constituents are removed under reduced pressure at about 90–95° C. The new quaternary ammonium salt which remains behind can be taken up in hot water to form an opalescent solution.

Example 5

103 parts of diethylene triamine are run at a temperature below 40° C. into 106 parts of acrylonitrile, the temperature is raised to 60° C. in the course of one hour, stirring is continued for a further 2 hours at 60–65° C., and volatile constituents are removed under reduced pressure at the aforesaid bath temperature.

190 parts of the acrylonitrile addition product so obtained are heated in a current of nitrogen at 110° C., and then 160 parts of ethylene oxide are introduced in the form of a finely distributed gas stream at 110–120° C.

90 parts of the hydroxyethylation product so obtained are heated with 63 parts of stearic acid for 6 hours in a current of nitrogen in a bath having a temperature of 160–165° C., and the water split off during the amidation is distilled off. 127.4 parts of the amide so obtained and 74 parts of epichlorhydrin are heated for 6 hours in a current of nitrogen at 70–75° C. There is obtained a soft mass which is clearly soluble in warm water.

Example 6

68 parts of piperazine are heated in a current of nitrogen to 130° C., and then 69.6 parts of ethylene oxide are introduced in the form of a finely distributed gas stream at 130–140° C. The greater part of the dioxyethyl-piperazine so obtained boils at 183–192° C. under a pressure of 13 mm. of mercury.

35 parts of the dioxyethyl-piperazine and 37 parts of epichlorhydrin are heated in a current of nitrogen for 6 hours in a boiling water bath. The new quaternary ammonium compound is a resinous mass, which is easily soluble in water and precipitates acid dyestuffs. For the purpose of purification it may be extracted with boiling chloroform, in which the starting materials dissolve easily. The new quaternary ammonium salt is useful as an agent for imparting anti-electrostatic effects.

Example 7

23.6 parts of the reaction product of 4 molecular proportions of ethylene oxide on 1 molecular proportion of ethylene diamine (which product is obtainable in a manner analogous to that described in Examples 3 and 4 for preparing the hydroxyethylation products of diethylene triamine) are stirred with 27.8 parts of epichlorhydrin in a current of nitrogen for 6 hours in a boiling water bath. After extracting the product at the boil with acetone, the residue insoluble in acetone is freed from solvent, and is then a ropy viscous mass which dissolves easily in water. The new product is useful as an agent for imparting anti-electrostatic effects.

Example 8

15 parts of diethylene triamine are heated in a current of nitrogen at 100° C. and then 96.1 parts of ethylene oxide are introduced at 100–140° C. in the form of a finely distributed gas stream.

38.1 parts of the hydroxyethylation product so obtained and 18.5 parts of epichlorhydrin are heated in a current of nitrogen for 6 hours on a boiling water bath. There is obtained a viscous liquid, which is easily soluble in water. For further purification the reaction product may be boiled with acetone, in which the product is sparingly soluble. It can be used as an anti-electrostatic agent.

Example 9

43.8 parts of triethylene tetramine are heated in a current of nitrogen at 120° C., and then 79.2 parts of ethxylene oxide are introduced in the form of a finely distributed gas stream at 120–160° C.

41 parts of the hydroxyethylation product so obtained and 46.3 parts of epichlorhydrin are heated in a current of nitrogen for 6 hours in a boiling water bath. After being boiled with chloroform, in which the starting materials are easily soluble, the new quaternary salt is in the form of a very viscous ropy mass which is easily soluble in water. It can be used for imparting anti-electrostatic effects to textiles.

*Example 10*

18.9 parts of tetraethylenepentamine are heated in a current of nitrogen to 120° C., and then 30.8 parts of ethylene oxide are introduced as a finely distributed gas stream at 120–130° C.

24.9 parts of the hydroxyethylation product so obtained are heated with 27.7 parts of epichlorhydrin in a current of nitrogen for 6 hours in a boiling water bath. After extraction at the boil with acetone, which readily dissolves the starting materials, the new quaternary ammonium salt is obtained in the form of a soft ropy mass, which is easily soluble in water and is useful as an antielectrostatic agent.

*Example 11*

Viscous artificial silk is treated at a liquor ratio of 1:30 for 30 minutes at 30° C. with 0.4 percent of the product obtained as described in the second paragraph of Example 1. After centrifuging and drying the material, it has a soft feel. When the material so treated is heated, after being dried, for 5 minutes at 145° C., the viscous artificial silk still possesses a soft feel even after being washed with soap at 95° C. Fibers of polyacrylonitrile and of polyamides also require a soft feel when treated with the aforesaid product.

*Example 12*

A yarn of a polyamide obtainable from hexamethylene diamine and adipic acid is treated at a liquor ratio of 1:10 with a solution containing, per liter, 10 grams of the quaternary ammonium salt obtained as described in the second paragraph of Example 6, and also 0.5 gram of triethylene tetramine, for 5 minutes at 20° C., and then, after being dried, the impregnated material is heated for one hour at 120° C. By this treatment the electrical conductivity of the yarn is substantially improved.

*Example 13*

A yarn of polyacrylonitrile fibers is treated at 20° C. with a solution containing, per liter, 10 grams of the product obtained as described in the second paragraph of Example 9, and also 0.5 gram of triethylene tetramine. After being dried, the treated textile material is heated for one hour at 120° C. By this treatment the surface conductivity of the textile material is substantially improved. Even after being washed with soap at 50–60° C., the textile material dressed in this manner conducts electricity better than the untreated material.

What is claimed is:

1. A water-soluble quaternary ammonium compound containing oxirane rings which is obtained by quaternating 1 mol of the condensation product from 1 mol of an N-alkyl-propylene diamine in which the alkyl radical contains 16 to 18 carbon atoms and 7 mols of ethylene oxide and which condensation product contains two tertiary amino groups and is present in its free state, with 2 mols of epichlorhydrin in a nonaqueous medium at temperatures ranging from 70 to 120° C.

2. A water-soluble quaternary ammonium compound containing oxirane rings which is obtained by quaternating 1 mol of the condensation product from 1 mol of piperazine and 2 mols of ethylene oxide and which condensation product contains two tertiary amino groups and is present in its free state, with 2 mols of epichlorhydrin in a non-aqueous medium at temperatures ranging from 70 to 120° C.

References Cited in the file of this patent

UNITED STATES PATENTS

| | | |
|---|---|---|
| 2,136,928 | Schlack | Nov. 15, 1938 |
| 2,143,388 | Schlack | Jan. 10, 1939 |